(12) United States Patent
Alnås et al.

(10) Patent No.: US 11,575,470 B2
(45) Date of Patent: Feb. 7, 2023

(54) TERMINAL DEVICE, NETWORK NODE AND METHOD FOR RANDOM ACCESS IN COVERAGE ENHANCEMENT OPERATION

(71) Applicant: Sony Group Corporation, Tokyo (JP)

(72) Inventors: Svante Alnås, Lund (SE); Lars Nord, Lund (SE); Anders Berggren, Lund (SE); Linh Trang, Åakarp (SE)

(73) Assignee: Sony Group Corporation, Tokyo (JP)

( * ) Notice: Subject to any disclaimer, the term of this patent is extended or adjusted under 35 U.S.C. 154(b) by 117 days.

(21) Appl. No.: 17/232,962

(22) Filed: Apr. 16, 2021

(65) Prior Publication Data
US 2021/0242970 A1    Aug. 5, 2021

Related U.S. Application Data

(63) Continuation of application No. 16/074,780, filed as application No. PCT/EP2016/052604 on Feb. 8, 2016.

(51) Int. Cl.
| | |
|---|---|
| *H04W 74/08* | (2009.01) |
| *H04W 48/12* | (2009.01) |
| *H04L 1/08* | (2006.01) |
| *H04W 74/00* | (2009.01) |
| *H04W 16/26* | (2009.01) |

(52) U.S. Cl.
CPC ............... *H04L 1/08* (2013.01); *H04W 16/26* (2013.01); *H04W 74/004* (2013.01); *H04W 74/0858* (2013.01); *H04W 48/12* (2013.01); *H04W 74/0833* (2013.01)

(58) Field of Classification Search
CPC .... H04W 74/004; H04W 48/12; H04W 72/08
USPC ......................................................... 370/329
See application file for complete search history.

(56) References Cited

U.S. PATENT DOCUMENTS

| | | |
|---|---|---|
| 2014/0079013 A1 | 3/2014 | Kim et al. |
| 2016/0337988 A1 | 11/2016 | Fang et al. |

FOREIGN PATENT DOCUMENTS

| | | |
|---|---|---|
| CN | 104904281 A | 8/2018 |
| GB | 2529984 | 3/2016 |
| WO | 2007/052900 | 5/2007 |
| WO | 2013/025148 | 2/2013 |
| WO | 2015/009063 | 1/2015 |
| WO | 2015/119548 | 8/2015 |
| WO | 2015/139318 | 9/2015 |

OTHER PUBLICATIONS

KR Office Action and Translation for corresponding KR Application No. 10-2018-7023292 dated Nov. 13, 2020.
"Random access procedure for enhance coverage UEs," 3GPP TSG RAN WG1 Meeting #82bis, Nokia Networks, Oct. 9, 2015, Malmo, Sweden.

(Continued)

*Primary Examiner* — Angel T Brockman
(74) *Attorney, Agent, or Firm* — Renner, Otto, Boisselle & Sklar, LLP

(57) ABSTRACT

A terminal device is operative to receive a broadcast message (91) from a cellular network, the broadcast message (91) including at least one bit associated with coverage enhancement, CE, operation of the terminal device. The terminal device is operative to control, when the terminal device is in CE operation, a radio interface to selectively delay, based on the at least one bit included in the broadcast message (91), a CE level dependent repetition of a random access preamble transmission (93, 94).

16 Claims, 7 Drawing Sheets

(56) References Cited

OTHER PUBLICATIONS

"Random access for NB-IOT," #GPP TSG-RAN WG2 Meeting NB-IOT ad-hoc, Ericsson, Jan. 2016, Budapest, Hungary.
Intel Corporation: "Discussion on PRACH Coverage Enhancement for Low Cast MTC", 3GPP Draft; RI-132930—Discussion on PRACH Coverage Enhancement for Low Cost MTC, 3rd Generation Partnership Project (3GPP), Mobile Competence Centre; 650, Route Des Lucioles; F-06921 Sophia-Antipo, vol. RAN WGI, No. Barcelona, Spain; Aug. 19, 2013-Aug. 23, 2013, Aug. 10, 2013 (Aug. 10, 2013), XP050716170, Retrieved from the Internet: URL: http://www.3gpp.org/ftp/tsg -ran/WGI -RL 1/TSGRI 74/Docs/ [retrieved on Aug. 10, 2013] p. 2, line 7, paragraph 2.2—line 8 p. 4; table 5.

TERMINAL DEVICE, NETWORK NODE AND METHOD FOR RANDOM ACCESS IN COVERAGE ENHANCEMENT OPERATION

This application is a continuation of U.S. patent application Ser. No. 16/074,780 filed on Feb. 8, 2016, which is a National Phase of International Patent Application No. PCT/EP2016/052604, filed on Feb. 8, 2016, the entire disclosures of which are hereby incorporated by reference.

TECHNICAL FIELD

Embodiments of the invention relate to wireless communication. Embodiments of the invention relate in particular to devices, systems and methods that support coverage enhancement (CE) to provide increased coverage for cells of a cellular network.

BACKGROUND

With increasing popularity of mobile data communication, an ever increasing number of devices are equipped with a radio interface for communication with a cellular network.

In order to accommodate the ever increasing number of devices that can connect to a cellular network, machine type communication (MTC) is being developed. In order to improve the likelihood that terminal devices that are located close to the boundary of a cell of a cellular network can still connect to the cellular network, coverage enhancement (CE) can be used. Coverage enhancement is based on transmission repetition. Coverage enhancement is targeted to improve a radio link by using transmission repetition, leading to a higher accumulated received power because the accumulated energy of the repeated signals may be combined at the eNodeB.

Coverage enhancement may be implemented in such a manner that a plurality of different coverage enhancement levels is available. In evolved MTC (eMTC), up to 15 dB coverage enhancement may be available. In case of Narrow band IoT (NB_IoT) up to 20 dB coverage enhancement or even greater coverage enhancement may be attainable. The coverage enhancement might be useful for devices that are positioned outside the normal cell boundary or that may be located in a basement or in another location where attenuation of signals between the base station and the terminal device is large. The coverage enhancement levels may be divided in steps of a fixed dB-value, such as in steps of 3 dB. Each one of the different coverage enhancement levels may be associated with a different number of required transmission repetitions. For higher coverage enhancement levels, i.e. those levels that provide the largest coverage enhancement, the number of repetitions may be in excess of 10. The number of repetitions may be dependent on channel, e.g. different numbers of repetitions may be used for PRACH, PUCCH, PDSCH or PUSCH.

The repetition of transmissions that depends on coverage enhancement level will also apply to random access procedures. In particular, the transmission of the random access preamble, which is msg1 in a random access procedure, by a terminal device may be repeated for a number of times that depends on coverage enhancement level, until a random access response is received. This repetition of a transmission, that will be referred to as CE level dependent repetition in the following, must not be confused with the retransmissions of a random access preamble that occurs also in systems without coverage enhancement. The CE level dependent repetition of the random access preamble transmission is typically implemented in addition to, i.e. on top off, the repetition of random access preamble transmission that occurs without any coverage enhancement. This increased number of random access preamble transmissions, i.e. the higher number of repetitions that is caused by the combination of CE level dependent repetition and legacy retransmissions of random access preamble transmission, may give rise to congestion situations in a radio access network.

One approach to address such congestion situations could be preventing some terminal devices from performing the CE level dependent repetition of random access preamble transmissions altogether, barring off the device. Such approaches may, however, preclude terminal devices from performing random access even in cases in which the terminal device is sensitive to increased latency. This may be the case when the terminal device has a subscription level that should normally guarantee good service to the terminal device or if the terminal device can otherwise not accept increased latency, e.g. because it requires cellular access for specific purposes.

SUMMARY

There is a need in the art for devices, systems and methods which mitigate at least some of the above shortcomings. There is a need for devices, systems and methods that mitigate the risk of congestion occurring in the physical random access channel (PRACH) resources allocated for random access in one or several coverage enhancement (CE) levels. There is a need for devices, systems and methods that mitigate the risk of PRACH resource congestion in cellular systems that support coverage enhancement while not imposing an absolute barring that prevents terminal devices from performing a CE level dependent repetition of random access preamble transmission.

According to embodiments, there are provided mechanisms that allow a cellular network to prioritize terminal devices within a CE level. A cellular network may indicate, e.g. by setting one or several bits in a broadcast message, that a congestion situation already exists or is likely to arise. Terminal devices may interpret the broadcast message and may activate a backoff behavior which causes a terminal device to delay performing are CE level dependent repetition of random access preamble transmissions. The backoff behavior may respectively be dependent on whether the terminal device accepts latency in mobile originated traffic and, if so, which degree of latency is acceptable.

A terminal device according to an embodiment comprises a radio interface operative to receive a broadcast message from a cellular network, the broadcast message including at least one bit associated with CE operation of the terminal device. The terminal device comprises an electronic circuit operative to control, when the terminal device is in CE operation, the radio interface to selectively delay, based on the at least one bit included in the broadcast message, a CE level dependent repetition of a random access preamble transmission.

By selectively delaying the CE level dependent repetition of the random access preamble transmission, the terminal device is not absolutely barred from performing the CE level dependent repetition. By delaying the CE level dependent repetition of the random access preamble transmission in a selective manner, based on the at least one bit included in the broadcast message, different terminal devices may react differently to the broadcast message. For illustration, terminal devices may decide on whether and according to which backoff procedure the CE level dependent repetition is to be delayed in dependence on terminal related information, such as device type or subscription level, or in dependence on the reason for connection establishment, such as public safety or non-public safety.

The terminal device may be a user equipment, a machine type communication (MTC) terminal device, or a Narrow-Band Internet of Things (NB-IoT) terminal device. The terminal device may be a handheld device, such as a cellular phone or a portable computer. The terminal device may be are wearable device, such as a body mounted sensor. The terminal device may be as sensor or control unit that is installed in a vehicle, a building, or in another location.

The electronic circuit may be operative to delay the CE level dependent repetition of the random access preamble transmission based on terminal related information if the at least one bit included in the broadcast message indicates that backoff behavior is desired. The terminal related information may be a subscription information, e.g. a subscription level, and/or a device type of the terminal device.

The electronic circuit may be operative to control a backoff behavior that delays the CE level dependent repetition of the random access preamble transmission based on both the at least one bit included in the broadcast message and the terminal related information. The terminal related information may be a subscription level and/or the device type of the terminal device.

The electronic circuit may be operative to delay the CE level dependent repetition of the random access preamble transmission based on communication related information if the at least one bit included in the broadcast message indicates that backoff behavior is desired. The communication related information may be whether a connection is required for public safety purposes or non-public safety purposes. The communication related information may be whether the connection is required for emergency communication.

The electronic circuit may be operative to delay the CE level dependent repetition of the random access preamble transmission if the connection is required for non time critical data.

The electronic circuit may be operative to delay the CE level dependent repetition of the random access preamble transmission until a trigger event is detected.

The trigger event may be dependent on the subscription level and/or the device type of the terminal device.

The electronic circuit may be operative to detect time-dependent changes in CE level while the CE level dependent repetition of the random access preamble transmission is delayed. The electronic circuit is operative to cause the radio interface to perform the CE level dependent repetition of the random access preamble transmission based on the detected time-dependent changes in CE level.

The electronic circuit may be operative to cause the radio interface to perform the CE level dependent repetition of the random access preamble transmission in response to detecting that the CE level has reached a CE level threshold.

The electronic circuit may be operative to cause the radio interface to perform the CE level dependent repetition of the random access preamble transmission in response to detecting that the CE level has changed by at least a CE level threshold.

The electronic circuit may be operative such that the CE level dependent repetition of the random access preamble transmission is triggered both by the CE level reaching the CE level threshold and by expiry of a backoff timer. The occurrence of the CE level reaching the CE level threshold and the expiry of the backoff timer will each trigger the terminal device to repeat the random access preamble transmission until a CE level dependent maximum number of repetitions is reached. I.e., the earlier one of the CE level reaching the CE level threshold and expiry of the backoff timer causes the random access preamble to be transmitted again.

A timer value of the backoff timer and/or the CE level threshold may be dependent on the subscription level. Alternatively or additionally, the timer value of the backoff timer and/or the CE level threshold may be dependent on the device type.

The electronic circuit may be operative to set the backoff timer to the timer value by adding an offset that depends on subscription level and/or device type to a timer value that may be configured or provisioned by the network. The electronic circuit may be operative to set the backoff timer to the timer value by multiplying a timer value that may be configured or provisioned by the network by a factor which depends on subscription level and/or device type. The factor may be greater than one for one or several subscription levels. The factor may be a power of 2 for one or several subscription levels. The factor may be less than one for the best subscription level.

The timer value of the backoff timer may further be dependent on the CE level. The timer value of the backoff timer may be a monotonously increasing function of the number of CE level dependent repetitions in the respective CE level.

The electronic circuit may be operative to determine whether the subscription level of the terminal device is included in a sub-set of subscription levels.

The electronic circuit may be operative to delay the CE level dependent repetition of a random access preamble transmission selectively only if the subscription level of the terminal device is included in the sub-set. For illustration, the terminal device may refrain from activating a backoff behavior if it has a subscription level that should ensure the terminal device to be provided with the best available service.

If the subscription level of the terminal device is included in the sub-set of subscription levels which causes the terminal device to backoff by delaying the CE level dependent repetition of a random access preamble transmission, the backoff behavior may be still dependent on subscription level. For illustration, silver and bronze subscription levels may be distinguished in terms of backoff timer values and/or CE level thresholds, so that a terminal device having bronze subscription level will on average have longer latency in performing the CE level dependent repetition of the random access preamble transmission than a terminal device having silver subscription level.

The at least one bit associated with CE operation may be included in a system information block (SIB). The SIB in which the at least one bit is included to cause backoff behavior when congestion situations occur may apply to the device type(s) for which the backoff behavior is desired. For illustration, if only MTC terminal devices are to delay the CE level dependent repetition of the random access preamble transmission, the at least one bit may be include in a SIB that is read specifically by MTC terminal devices.

The at least one bit may be a single bit that causes the terminal device to switch on and off, respectively, the backoff behavior. The at least one bit may include a parameter encoded in several bits, which may indicate which type of backoff behavior is to be activated. The parameter may indicate which CE level is affected by a potential congestion situation. The parameter may indicate a backoff timer value or a CE level threshold.

The electronic circuit may be operative to cause the radio interface to perform the CE level dependent repetition of the random access preamble transmission such that all CE level dependent repetitions are in the same resource block of a time-frequency resource grid.

The terminal device may comprise a storage device, e.g. a non-volatile memory such as a solid state memory, to store parameters related to the CE-level dependent backoff behavior. The parameters may include one or several of: a set of back-off rules, subscription levels, back-up factors, and/or CE-level thresholds.

The terminal device may be operative such that the parameters related to the CE-level dependent backoff behavior may be provisioned. The terminal device may be operative such that the parameters related to the CE-level dependent backoff behavior may be configured by the network. Alternatively or additionally, some or all of the parameters related to the CE-level dependent backoff may be provisioned via a subscriber identity module, SIM.

The terminal device may be operative to receive a further broadcast message that includes at least part of the parameters related to the CE-level dependent backoff behavior. An indicator bit in a subsequent broadcast message may cause the terminal device to start using the parameters related to the CE-level dependent backoff behavior.

A cellular network node according to an embodiment comprises a radio interface to receive random access preambles from terminal devices. The cellular network node comprises a circuit coupled to the radio interface and operative to perform congestion monitoring for physical random access channel (PRACH) resources for one or several CE levels. The circuit is operative to control the radio interface based on the congestion monitoring to broadcast a message that includes at least one bit associated with CE operation of terminal devices to cause part of the terminal devices to delay a CE level dependent repetition of a random access preamble transmission.

The cellular network node may be an eNodeB.

The cellular network node may be operative such that the congestion monitoring is performed for each one of several CE levels. The cellular network node may be operated such that a congestion in any one of the several CE levels will cause the cellular network node to broadcast a message that includes at least one bit set to indicate that latency tolerant terminal devices are to delay the CE level dependent repetition of the random access preamble transmission.

The cellular network node may be operative to set the at least one bit associated with CE operation of terminal devices so as to prioritize terminal devices for performing random access in CE operation.

The cellular network may be operative such that parameters related to the CE-level dependent backoff behavior may be provisioned. The parameters elated to the CE-level dependent backoff behavior may include one or several of: a set of back-off rules, subscription levels, back-up factors, and/or CE-level thresholds.

The cellular network may be operative such that parameters related to the CE-level dependent backoff behavior may be broadcast and may subsequently activated by setting the at least one bit in the subsequent broadcast message.

The congestion monitoring performed by the cellular network node may monitor energy in the PRACH resource blocks that are assigned to different CE levels. If the energy in the PRACH resource block(s) assigned to any one of the CE levels exceeds an energy threshold, a congestion situation may be detected.

The congestion monitoring performed by the cellular network node may be operative to detect a risk of a congestion situation even before the congestion situation occurs. To this end, historical data may be used by the cellular network node. If congestion situations are consistently detected at the same time of day and/or the same day of the week, the cellular network node may determine that a congestion situation exists in these times and may transmit the broadcast message with the at least one bit set to activate backoff behavior in at least some terminal devices so as to prevent congestion from occurring. Alternatively or additionally, time-dependent increases in energy in the PRACH resource(s) for one or several CE levels may cause the cellular network node to request latency tolerant terminal devices to delay the CE level dependent repetitions of random access preamble transmissions.

A communication system according to an embodiment comprises the cellular network node according to an embodiment and at least one terminal device according to an embodiment.

The communication system may comprise a first terminal device having a first subscription level. The communication system may comprise a second terminal device having a second subscription level different from the first subscription level.

Due to the different subscription levels, the first and second terminal devices may be operative to exhibit different backoff behaviors in response to the same broadcast message. For illustration, if one of the first and second terminal devices has the highest subscription level, this terminal device may not further delay the CE level dependent repetition of random access preamble transmission at all, while the other terminal device may activate a backoff behavior. For further illustration, both the first and the second terminal device may activate a backoff behavior to delay a CE level dependent repetition of a random access preamble transmission, wherein the delay is on an average shorter for the one of the terminal devices that has the better subscription level.

Alternatively or additionally, the communication system may comprise a first terminal device having a first device type. The communication system may comprise a second terminal device having a second device type different from the first device type.

Due to the different device types, the first and second terminal devices may be operative to activate different backoff behaviors in response to the same broadcast message. For illustration, if one of the first and second terminal devices is an eMTC terminal while the other one is not, only the eMTC terminal may activate a backoff behavior to delay a CE level dependent repetition of a random access preamble transmission.

The cellular network may be operative such that parameters related to the CE-level dependent backoff behavior may be provisioned. The parameters elated to the CE-level dependent backoff behavior may include one or several of: a set of back-off rules, subscription levels, back-up factors, and/or CE-level thresholds.

A method of performing random access when a terminal device is in coverage enhancement operation comprises receiving, by the terminal device, a broadcast message from a cellular network. The broadcast message includes at least one bit associated with coverage enhancement, CE, operation of the terminal device. The method comprises controlling, when the terminal device is in CE operation, a radio interface of the terminal device to selectively delay, based on the at least one bit included in the broadcast message, a CE level dependent repetition of a random access preamble transmission.

The method may be performed by the terminal device according to an embodiment.

Additional features of the method that may be implemented in embodiments correspond to the features described with reference to the terminal device, base station and communication system according to embodiments.

While the terminal device may be operative such that its backoff behavior is triggered by receipt of a broadcast message that includes at least one bit to indicate that the backoff behavior is desired by the network, the terminal device and the method performed thereby are not limited to this related mechanism.

A terminal device according to a further embodiment comprises a radio interface operative to transmit a random access preamble. The terminal device comprises an electronic circuit operative to control, when the terminal device is in CE operation, the radio interface to delay a CE level dependent repetition of a random access preamble transmission. The electronic circuit may be operative such that the CE level dependent repetition of the random access preamble transmission is triggered both by expiry of a backoff timer and by the CE level fulfilling a threshold criterion.

The backoff timer may be set to a timer value that depends on subscription level and/or device type. Setting the backoff timer may comprise adding an offset that depends on subscription level and/or device type to a timer value that may be configured or provisioned by the network. Setting the backoff timer may comprise multiplying a timer value that may be configured or provisioned by the network by a factor which depends on subscription level and/or device type. The factor may be greater than one for one or several subscription levels. The factor may be a power of 2 for one or several subscription levels. The factor may be less than one for the best subscription level.

The threshold criterion may be fulfilled when the CE level has reached a CE level threshold or if a change in CE level has reached the CE level threshold.

A method of performing random access according to another embodiment comprises controlling, when a terminal device is in CE operation, a radio interface of the terminal device to delay a CE level dependent repetition of a random access preamble transmission. The CE level dependent repetition of the random access preamble transmission may be triggered both by expiry of a backoff timer and by the CE level fulfilling a threshold criterion.

In a terminal device and method according to these embodiments, it is possible but not always required that the backoff behavior that causes the CE level dependent repetition of the random access preamble transmission to be delayed is activated by bit values in a broadcast message. In a terminal device and method having such a configuration, it is ensured that the terminal device does not need to delay the repeated transmission of the random access preamble until a backoff timer has expired if the radio conditions have improved, i.e. attenuation has decreased, such that there is a higher likelihood of the eNodeB responding to a random access attempt.

In any one of the embodiments, a CE level dependent repetition of a random access preamble transmission may be distinguished from other, legacy repetitions of a random access preamble transmission in that the CE level dependent repetition is performed for a number of times that depends on the CE level, unless a random access response is received before the CE level dependent maximum number is reached. The CE level dependent repetition may also be distinguished from other, legacy repetitions of the random access preamble transmission in that the CE level dependent repetition is not performed if the terminal device is located in normal coverage, but is only performed when the terminal device is located outside normal coverage and in CE operation.

In any one of the embodiments, the backoff timer value and/or the CE level threshold may be configured by the cellular network or may be provided in the terminal devices in a static or semi-static manner.

Various effects are attained by the devices, systems, and methods according to embodiments. Congestion in PRACH resources may be avoided by activating backoff behavior for random access preamble transmission in terminal devices that accept higher latencies. Different subscription levels, device types or other device-related characteristics may be taken into account when interpreting the broadcast message from the cellular network. In embodiments that combine a backoff timer with monitoring of CE level changes, latency may be kept small for mobile terminal devices that may move into better coverage conditions. The terminal devices may be handheld devices or sensors, without being limited thereto.

BRIEF DESCRIPTION OF THE DRAWINGS

Embodiments of the invention will be described with reference to the accompanying drawings in which the same or similar reference numerals designate the same or similar elements.

DETAILED DESCRIPTION OF EMBODIMENTS

Exemplary embodiments of the invention will be described with reference to the drawings. While some embodiments will be described in the context of specific fields of application, e.g. in the context of certain communication techniques, the embodiments are not limited to this field of application. The features of the various embodiments may be combined with each other unless explicitly stated otherwise.

Figure 1:
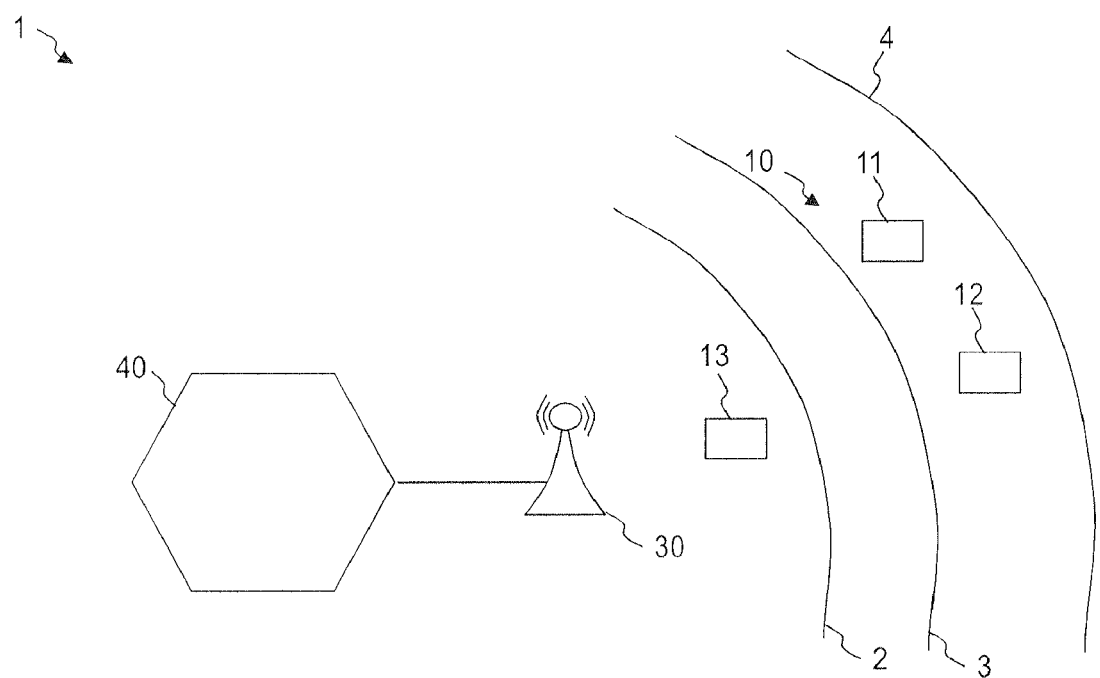
FIG. 1 is a schematic view of a communication system according to an embodiment.

FIG. 1 is a schematic view of a communication system 1 according to an embodiment.

The communication system 1 comprises a cellular network and terminal devices 11-13. The plurality 10 of terminal devices 11-13 may respectively be user equipments (UEs), Machine Type Communication (MTC) terminals, or NarrowBand Internet of Things (NB-IoT) terminal devices. The terminal devices 11-13 may respectively be mobile or stationary. Different terminal devices may be operative for communication with different cellular networks, such as a legacy LTE core network 40 and a Cellular Internet of Things (CIoT) core network.

The terminal devices 11-13 may be operative to perform random access (RA) to establish an RRC connected mode. Random access is the first step in establishing the RRC connected mode. Random access may be performed when paging information from a base station 30 indicates that there is downlink, i.e. Mobile Terminated (MT) traffic. Random access may be performed when the terminal devices intends to transmit uplink, i.e. Mobile Originating (MO) traffic.

The communication system 1 supports coverage enhancement (CE) operation. This allows terminal devices located outside the normal coverage 2 of the base station 30 to nevertheless establish an RRC connection. Different CE levels may be provided. The different CE levels may provide different coverage enhancement, as schematically indicated by the enhanced coverage radius 3, 4. The different CE levels may be defined in terms of the additional signal attenuation that may be accommodated. The maximum CE level may provide up to 15 dB coverage enhancement, for example. Even greater coverage enhancement, e.g. 20 dB, may be supported by NB-IoT, for example.

In order to attain coverage enhancement, terminal devices 11, 12 located outside the normal coverage 2 may repeat transmissions. The maximum number of times by which any transmission is repeated will depend on the CE level of the respective terminal device 11, 12. The base station 30 may be operative to accumulate or integrate the energy received in the repeated transmissions from the terminal devices 11, 12. Time diversity and/or energy integration at the base station 30 may provide the desired CE level, i.e., the desired additional attenuation that is accommodated.

As will be described in more detail below, the base station 30 and the terminal devices 11, 12 are operative to reduce the risk that a congestion situation occurs in PRACH resource blocks used for random access preamble transmission in one or several of the CE levels. To this end, the terminal devices 11, 12 may be operative to activate a backoff behavior that causes the terminal devices 11, 12 to delay the CE level dependent repetition of a random access preamble transmission. This backoff behavior may be selectively activated based on one or several bits included by the base station 30 in a broadcast message, such as a system information block (SIB). The terminal devices 11, 12 may react differently to such a broadcast message, depending on the subscription level, device class, and/or the cause for performing random access (e.g. public safety or non-public safety). The terminal devices 11, 12 may respectively operate to monitor both changes in CE level and expiry of a backoff timer in order to determine when the random access preamble transmission is to be repeated.

As explained above, the CE level dependent repetition of the random access preamble transmission that is selectively delayed in embodiments of the subject application must not be confused with the conventional repetition of a random access preamble transmission in a system that does not have coverage enhancement. The CE level dependent repetition is implemented on top of, i.e. in addition to the conventional periodic repetition of the random access preamble transmission. The CE level dependent repetition is distinguished from the legacy repetition of the random access preamble transmission in that it has a cut-off criterion, i.e. the CE level dependent repetition is terminated when a random access response is received or when a maximum number that depends on CE level its reach, whichever occurs earlier. The CE level dependent repetition is distinguished from the legacy repetition of the random access preamble transmission in that it is terminated after a CE level dependent maximum number of retransmissions, irrespective of whether or not a random access response has been received by then. The CE level dependent repetition is distinguished from the legacy repetition of the random access preamble transmission in that it is performed only in CE operation, but not when the terminal is in normal coverage.

The backoff behavior that may be selectively activated by the terminal devices 11, 12 that are in CE operation may depend on the subscription level. For illustration, a terminal device 11 that has the best subscription level may not activate any backoff behavior at all, even when a broadcast message from the base station 30 indicates that latency tolerant terminal devices are to delay the CE level dependent repetition of the random access preamble transmission. Another terminal device 12 that does not have the best subscription level may activate a backoff behavior that causes the CE level dependent repetition of the random access preamble transmission to be delayed. Several terminal devices that respectively activate a backoff behavior may exhibit different backoff behavior and, in particular, different average delays by which the repetition of the random access preamble transmission is delayed when they have different subscription levels and/or different device classes, even if they are in the same CE level.

Figure 2:
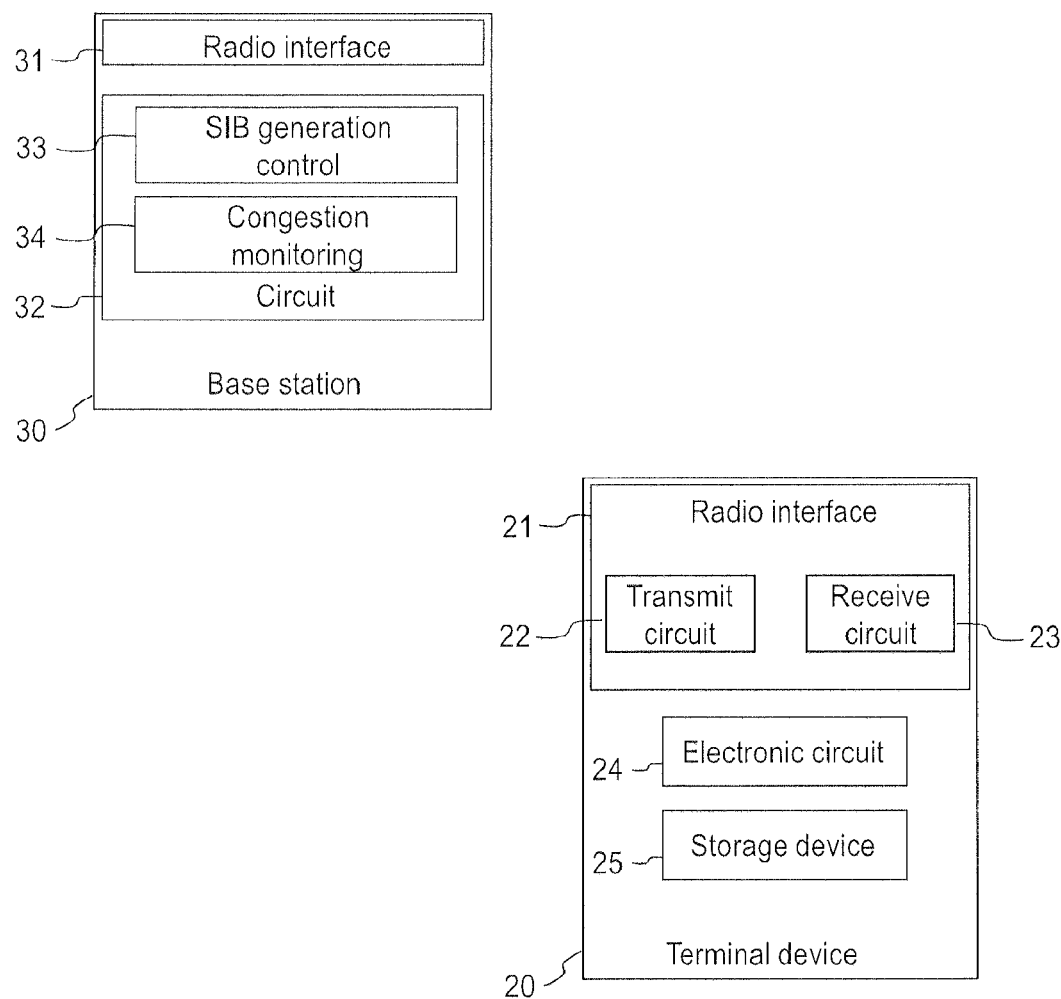
FIG. 2 is a block diagram of a communication system according to an embodiment.

FIG. 2 is a block diagram of a terminal device 20 and a base station 30 according to an embodiment. Each one of the terminal devices 10 of the communication system 1 of FIG. 1 may be implemented as described for the terminal device 20 with reference to FIG. 2.

The terminal device 20 has a radio interface unit 21 which may include a transmit circuit 22 and a receive circuit 23. The radio interface unit 21 may be configured to transmit and receive signals to and from a cellular network which may be an evolved Machine-Type-Communication (eMTC) RAN, a narrowband IoT (NB-IoT) or an eUTRAN.

Operation of the radio interface unit 21 may be adjustable under the control of a control circuit 24. The electronic circuit 24 may include one or several processors, controllers, application related integrated circuits (ASICs), other integrated circuits or combinations of such devices.

The electronic circuit 24 may be configured to measure a coverage extension level, e.g. based on attenuation of signal received by the radio interface unit 21. The electronic circuit 24 may be operative control the radio interface unit 21, when the terminal device 20 operates in CE mode, to perform a CE level dependent repetition of the radio access preamble transmission. Coverage enhancement is attained by such a repetition. The maximum number of CE level dependent repetitions depends on the respective CE level and increases with the desired additional attenuation that is to be accommodated.

The electronic circuit 24 may be operative to control the radio interface unit 21, when the terminal device 20 operates in CE mode, to delay the CE level dependent repetition of the radio access preamble transmission. This may be done selectively if a broadcast message, e.g. a SIB, includes at least one bit set to indicate that terminal devices that are latency tolerant are to back off from performing the CE level dependent radio access preamble transmission.

The electronic circuit 24 may be operative to control the radio interface unit 21, when the terminal device 20 operates in CE mode to delay the CE level dependent repetition of the radio access preamble transmission in a manner that depends on device related characteristics, such as subscription level or device type. The electronic circuit 24 may be operative to control the radio interface unit 21, when the terminal device 20 operates in CE mode, to delay the CE level dependent repetition of the radio access preamble transmission in a manner that depends on communication related characteristics, such as whether the random access is performed for public safety purposes, e.g. emergency, or non-public safety purposes. The electronic circuit 24 may access a storage medium 25 that may be non-volatile memory to determine in which manner the terminal device 20 is to delay the CE level dependent repetition of the radio access preamble transmission.

The electronic circuit 24 may be operative to continue monitoring time-dependent changes in CE level after the first random access preamble transmission did not result in receipt of a random access response. The electronic circuit 24 may be operative to cause the radio interface unit 21 to perform a first one or the next one of the CE level dependent repetitions of the radio access preamble transmission based on one or several trigger criteria. The electronic circuit 24 may operate such that either one of a threshold criterion of the monitored CE level and expiry of a backoff timer may cause the next one of the CE level dependent repetitions of the radio access preamble transmission to be performed. For illustration, the terminal device may perform the next one of the CE level dependent repetitions of the radio access preamble transmission if a backoff timer expires and when the CE level or a change in CE level fulfils a threshold criterion, whichever occurs earlier.

It will be appreciated that not only the CE level dependent repetitions of the radio access preamble transmission, but also the first radio access preamble transmission may be dependent on the monitored CE level. For illustration, the first transmission may be triggered when the CE level reaches a CE level threshold.

The operating parameters of the terminal device 20 that control the backoff behavior, e.g. the timer value of the backoff timer and/or the CE level threshold that triggers a repetition of the radio access preamble even if the backoff timer has not yet expired, may be configured by the cellular network or may be static or semi-static. The timer value of the backoff timer and/or the CE level threshold may depend on CE level. The timer value of the backoff timer and/or the CE level threshold may depend on subscription level and/or device type of the terminal device 20.

The base station 30 has a radio interface unit 31. The base station 30 may be an eNodeB. The radio interface unit 31 may be operative to transmit and receive signals over eUTRAN, a narrowband IoT (NB-IoT) and/or eMTC radio access networks, for example.

The base station 30 can provide CE operation. To this end, the base station 30 may process repeated signal transmissions from a terminal device 20. Time diversity and/or aggregation of energy from the repeated signal transmissions from the terminal device 20 lead to coverage enhancement in CE operation. A circuit 32 of the base station 30 may perform the required processing of the repeated signal transmissions from a terminal device 20.

The base station 30 is operative to perform congestion monitoring. The circuit 32 may include a congestion monitoring component 34. The congestion monitoring component 34 may be implemented by an integrated circuit or by a combination of several integrated circuits. The congestion monitoring may be performed for physical random access channel (PRACH) resources for one or several CE levels. The circuit 32 is operative to control the radio interface unit 31 based on the congestion monitoring.

The circuit 32 may detect that energy in the PRACH resources for one or several CE levels fulfil a threshold criterion, which indicates congestion. Alternatively or additionally, the congestion monitoring performed by the circuit 32 may be operative to detect a risk of a congestion situation even before the congestion situation occurs. To this end, historical data may be used by the circuit 32. If congestion situations are consistently detected at the same time of day and/or the same day of the week, the circuit 32 may determine that a congestion situation exists in these times and may transmit the broadcast message that there at least one bit set to activate backoff behavior in at least some terminal devices so as to prevent congestion from occurring. If a pronounced increase in energy in the RACH resources for one or several CE levels is detected, the circuit 32 may likewise detect that there is a risk of congestion even before the congestion situation occurs.

The circuit 32 may be operative such that the congestion monitoring is performed for each one of several CE levels. The circuit 32 may be operative such that a congestion in any one of the several CE levels will cause the base station 30 to broadcast a message that includes at least one bit set to indicate that latency tolerant terminal devices are to delay the CE level dependent repetition of the random access preamble transmission.

The circuit 32 may have a SIB generation control component 33. The SIB generation control component 33 may be implemented by an integrated circuit or by a combination of several integrated circuits. The circuit 32 may be operative to control the radio interface unit 31 to generate a SIB or another broadcast message, in which one or several bits are set to indicate that latency tolerant terminal devices are to delay the CE level dependent repetition of the random access preamble transmission.

Figure 3:
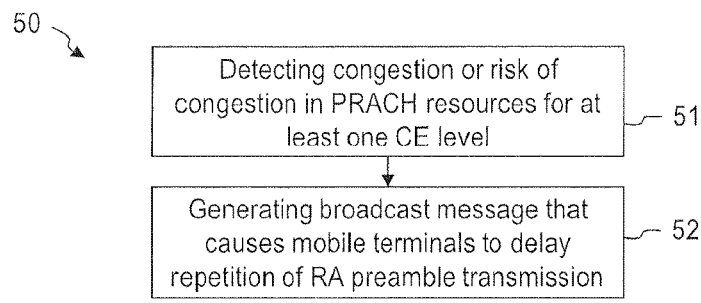
FIG. 3 is a flowchart of a method performed by a cellular network node according to an embodiment.

FIG. 3 is a flowchart of a method 50 according to an embodiment. The method 50 may be performed by base station 30 according to an embodiment.

At 51, the base station 30 detects a congestion or the risk of congestion in PRACH resources for at least one CE level.

At 52, the base station 30 generates a message, e.g. a SIB, that includes one or several bits set to indicate that latency tolerant terminal devices are to delay the CE level dependent repetition of the random access preamble transmission. The broadcast message that causes latency tolerant terminal devices to delay the CE level dependent repetition of the random access preamble transmission may be generated when the congestion monitoring indicates that there is congestion or the risk of congestion in the PRACH resources of any one of the various CE levels.

The base station may set the one or several bits so as to simply switch on and off, respectively, the backoff behavior in latency tolerant terminal devices. Alternatively, several bits may carry information, such as information indicating timer values, CE level thresholds, or affected CE levels, to attain an even greater degree of network control over terminal backoff behavior.

Figure 4:
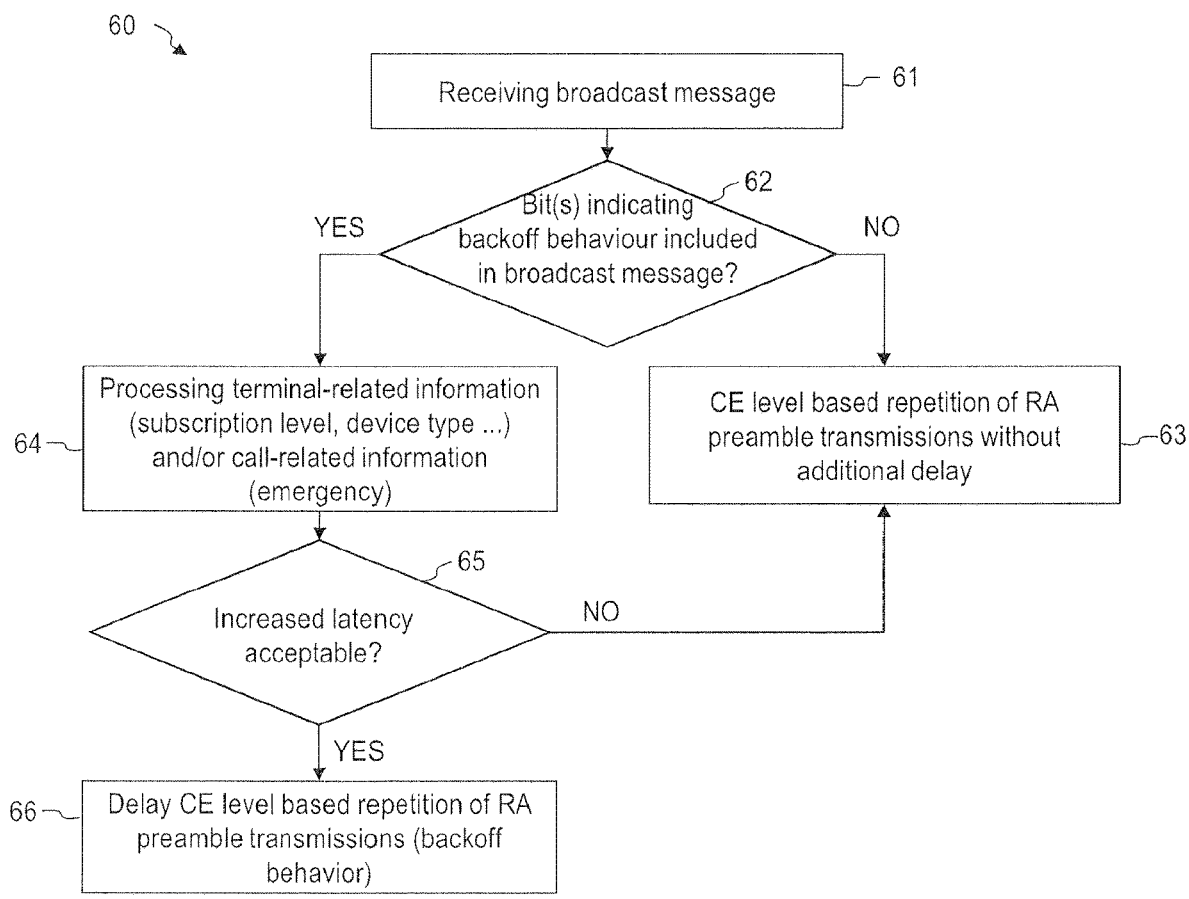
FIG. 4 is a flowchart of a method performed by a terminal device according to an embodiment.

FIG. 4 is a flowchart of a method 60 that may be performed by a terminal device 20 according to an embodiment.

At 61, the terminal device 20 receives a broadcast message. The broadcast message may be a SIB.

At 62, the terminal device 20 determines whether the received broadcast message has one or several bit(s) that are set so as to indicate that backoff behavior of terminal devices is desired by the network to mitigate congestion issues.

At 63, if the received broadcast message has one or several bit(s) that are set so as to indicate that backoff behavior of terminal devices is not desired by the network, CE level dependent repetitions of random access preamble transmission may be performed without introducing any extra delay. After an unsuccessful random access preamble transmission, the next CE level dependent repetition of the random access preamble transmission may be respectively performed after a time interval until either a random access response is received or a CE level dependent maximum number of repetitions is reached.

At 64, the terminal device 20 may process information to determine whether increased latency for random access is acceptable. The information may be device related information, such as a subscription level and/or device type of the terminal device. The information may be dependent on the cause for establishing the radio connection, such as whether the radio connection is required for a public safety purposes, emergency communication, or for a non-public safety purpose.

At 65, the terminal device 20 may determine whether increased latency for random access is acceptable. This may include determining whether the subscription level of the terminal device 20 is included in a sub-set of subscription levels that, by operator policy, forces the terminal device 20 to accept increased latency in random access. The determining at 65 may include determining whether the device class of the terminal device is such that increased latency in random access is acceptable. The determining at 54 may include determining whether the radio connection is required for public safety purposes, e.g. emergency communication, in which case increased latency may never be acceptable, irrespective of what the subscription level and device class are. If increased latency in random access is not acceptable, the method proceeds to step 63. The CE level dependent repetitions of random access preamble transmission are performed without introducing additional delay, until either a random access response is received or a CE level dependent maximum number of repetitions is reached.

At 66, if it is determined that increased latency in random access is acceptable, the terminal device delays the transmission of the next CE level dependent repetition of the random access preamble transmission. The next CE level dependent repetition of the random access preamble transmission may be delayed until a backoff timer expires and/or until the CE level of the terminal device has changed in such a manner that it fulfils a threshold criterion. A timer value of the backoff timer may be dependent on subscription level or device type. The next CE level dependent repetition of the random access preamble transmission may be triggered both by the backoff timer expiring and by the CE level fulfilling the threshold criterion, whichever occurs earlier.

Figure 5:
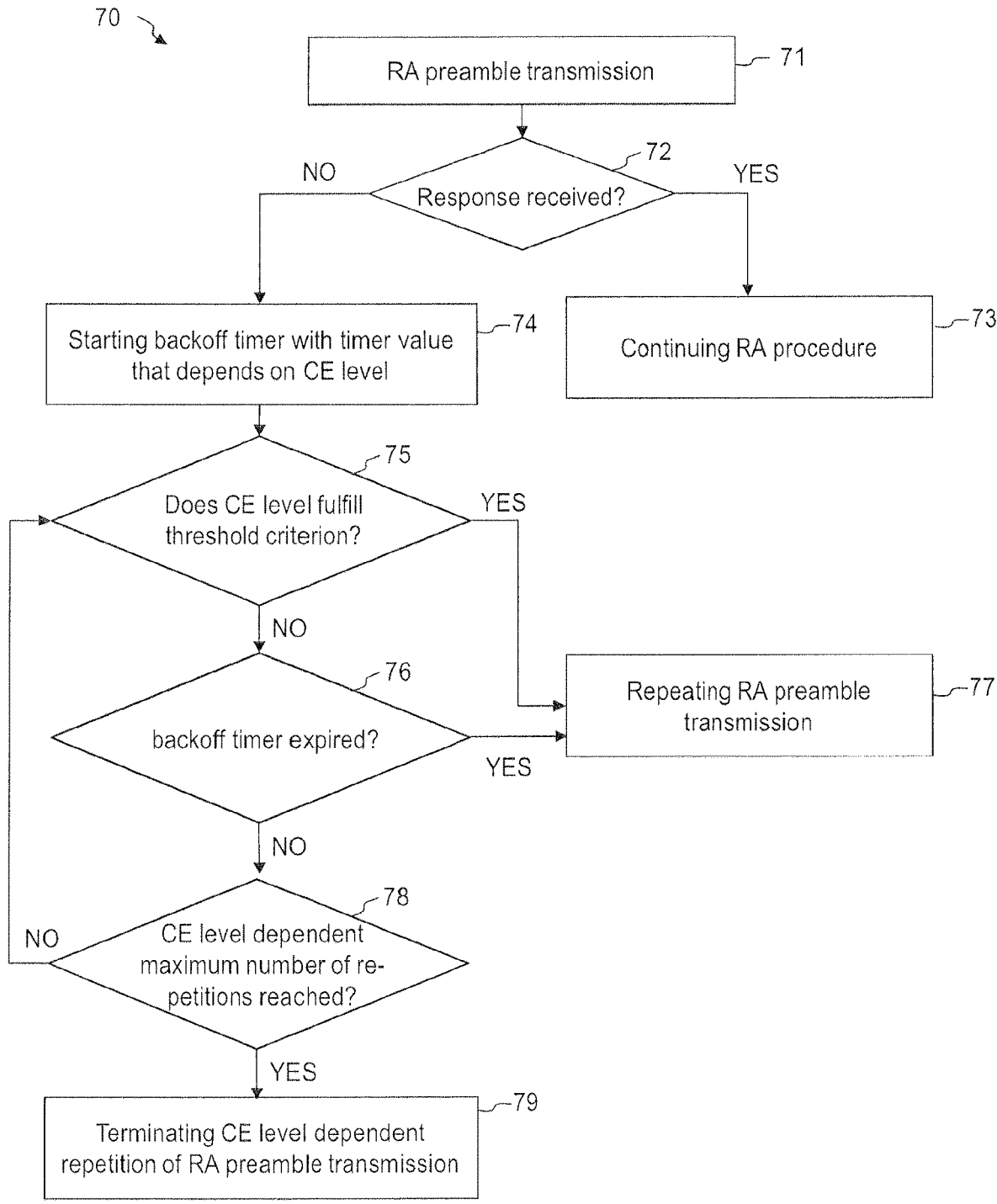
FIG. 5 is a flowchart of a method performed by a terminal device according to an embodiment.
Figure 6:
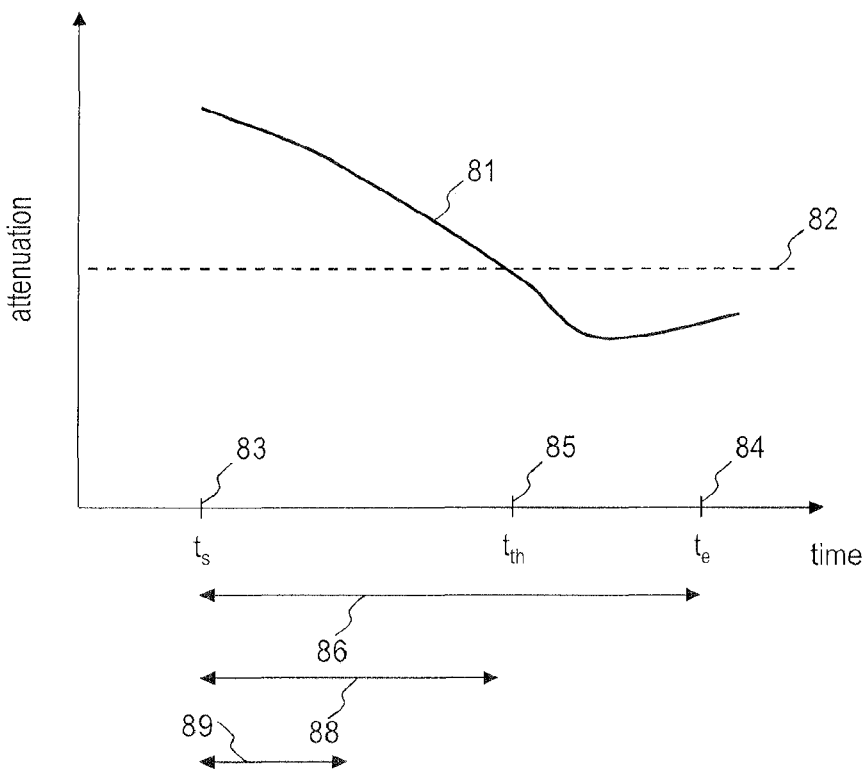
FIG. 6 is a diagram of a time-dependent variation in coverage enhancement level that illustrates operation of a terminal device according to an embodiment.
Figure 7:
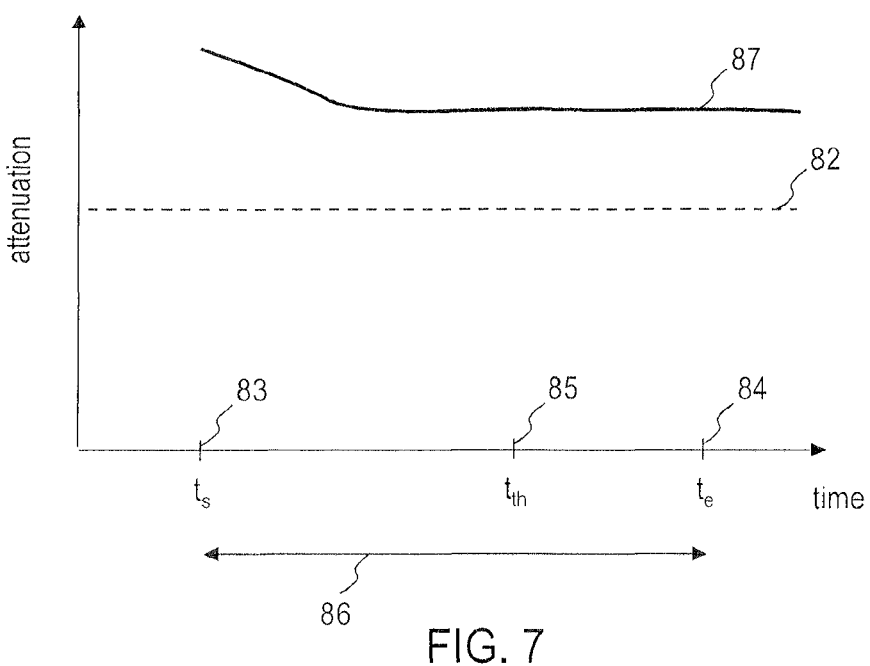
FIG. 7 is a diagram of a time-dependent variation in coverage enhancement level that illustrates operation of a terminal device according to an embodiment.

FIG. 5 is a flow chart of a method 70 that may be performed by the terminal device 20 according to an embodiment. The method 70 may be performed to implement the backoff behavior at step 66 of the method 60 of FIG. 4. The method 70 may be performed when a broadcast message from a cellular network node indicates that latency tolerant terminal devices are to back off from performing CE level dependent repetitions of the random access preamble transmission. However, the method 70 may also be performed without requiring any broadcast message that causes the terminal devices to back off from performing CE level dependent repetitions of the random access preamble transmission. The combination of CE level monitoring and expiry of a timer as further explained with reference to FIG. 5 to FIG. 7 is not even limited to network-controlled backoff procedures, but may also be used in other scenarios.

In the method 70, the terminal device may monitor time-dependent changes in CE level while a backoff timer is running. The backoff timer may be started when one of the CE level dependent repetitions of the random access preamble transmission is performed. The next random access preamble transmission may not only be triggered by expiry of the backoff timer, but may also be triggered by the CE level changing so as to fulfil a CE level criterion. For illustration, when the CE level improves such that a lower number of transmission repetitions is required, the next one of the CE level dependent repetitions of the random access preamble transmission may be performed even if the backoff timer has not yet expired.

At 71, the terminal device 20 transmits a random access (RA) preamble. A counter for counting the number of CE level dependent repetitions may be incremented to 1.

At 72, the terminal device 20 determines whether a random access response was received. If the random access response was received, the random access procedure may be continued at 73. The random access procedure may be a normal complexity procedure or a reduced complexity random access procedure. The random access procedure may include a scheduled transmission and a contention resolution, for example.

At 74, if no random access response was received in response to transmission of the random access preamble, a backoff timer is started in the terminal device. A timer value of the backoff timer may be set to be dependent on device dependent characteristics, such as subscription level or device type. The timer value of the backoff timer may be set in dependence on CE level. The timer value of the backoff timer may be set such that it increases proportionally to the number of transmissions in the respective CE level.

At 75, the terminal device 20 determines whether a CE level, which may have changed since the timer 74 was started, has changes to a value which triggers the next CE level dependent repetition of the random access preamble transmission. This may include a threshold comparison. For illustration, the current CE level may be compared to a CE level threshold. If the current CE level indicates that attenuation has decreased to the CE threshold, i.e. that fewer repetitions of transmissions are required, the next CE level dependent repetition of the random access preamble transmission is triggered. Alternatively or additionally, the change in CE level from the time at which the backoff timer was started may be monitored. The difference between the current CE level and the CE level at which the timer was started may be compared to a CE level threshold. If the difference in CE level indicates that attenuation is decreased by an amount that corresponds to the CE level threshold, i.e. that fewer repetitions are required, the next CE level dependent repetition of the random access preamble transmission is triggered. At 77, the next CE level dependent repetition of the random access preamble transmission is performed. If a random access response is received, the method may continue at 73. If no random access response is received, the repetition count may be increased to ensure that the number of CE level dependent repetitions will not exceed the CE level dependent maximum for the respective CE level. The timer may be reset, with the method returning to step 74.

At 76, expiry of the backoff timer may be monitored. Expiry of the backoff timer triggers the next CE level dependent repetition of the random access preamble transmission, even if the CE level has remained the same. At 77, the next CE level dependent repetition of the random access preamble transmission is performed. If a random access response is received, the method may continue at 73. If no random access response is received, the repetition count may be incremented to ensure that the number of CE level dependent repetitions will not exceed the CE level dependent maximum for the respective CE level. The timer may be reset, with the method returning to step 74.

At 78, it is determined whether the maximum number of repetitions for the respective CE level has been reached. If the maximum number has not yet been reached, the method returns to 75 to continue monitoring the CE level changes and the expiry of the timer.

At 79, if it is determined that the maximum number of repetitions for the respective CE level has been reached, the CE level dependent repetitions of the random access preamble transmission are terminated. It will be appreciated that the process of repeating the random access preamble transmission as explained with reference to FIG. 5 will be started again in accordance with a legacy retry that is performed, e.g. periodically, even when no coverage enhancement is provided.

FIG. 6 and FIG. 7 show a time-dependent change in CE level 81, 87 that may be monitored by a terminal device according to an embodiment to illustrate operation of terminal devices according to embodiments. FIG. 6 and FIG. 7 show the CE level represented by the additional attenuation that is accommodated.

Transmission of a random access preamble at a time 83 causes a backoff timer to be started. The backoff timer is set to a timer value 86. The timer value 86 may be dependent on subscription level, device class, or other device dependent parameters. The timer value 86 for at least one subscription level is longer than the time interval 89 between CE level dependent repetitions in the same CE level if backoff is not activated.

When changes in CE level are also monitored, the next CE level dependent repetition of the random access preamble transmission may be triggered at a time 85 when the CE level fulfils a threshold criterion. For illustration, when the CE level reaches a CE level threshold 82, the next CE level dependent repetition of the random access preamble transmission is performed even when the backoff timer has not yet expired.

In cases where the CE level does not reach the threshold 82, as illustrated in FIG. 7, the next CE level dependent repetition of the random access preamble transmission is at any rate performed upon expiry of the timer at time 84.

The timer values of the backoff timer and/or the CE level threshold may be dependent on subscription level. The monitoring to the CE level threshold does not need to be performed for all subscription levels.

In exemplary embodiments, there is at least one subscription level for which the timer value of the backoff timer has a timer value 86, 88 that exceeds the time interval 89 between transmission repetitions when there is no backoff behavior. Plural subscription levels may respectively be associated with timer values 86, 88 that each exceed the time interval 89. The time interval 89 is the interval between transmission repetitions when there is no backoff behavior. In at least one subscription level, e.g. the best or gold subscription level, the timer value of the backoff timer may be equal to the time interval 89.

In exemplary embodiments, a threshold comparison to the CE level threshold 82 is performed for at least one subscription level. The threshold comparison may be performed for several or even for all subscription levels. The CE level threshold 82 may be different for at least two different subscription levels.

Figure 8:
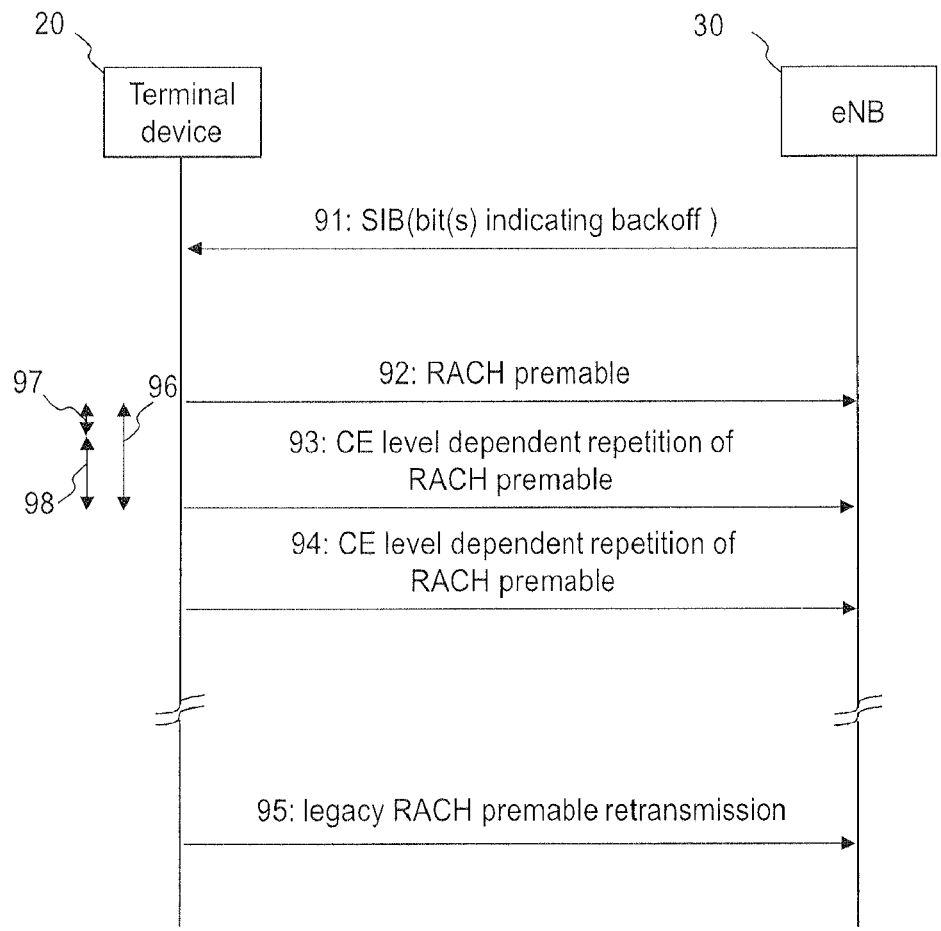
FIG. 8 is a signalling diagram in a communication system according to an embodiment.

FIG. 8 is a signalling diagram for a communication system according to an embodiment. The terminal device 20 and the eNodeB 30 operate to provide coverage enhancement. To this end, transmissions are repeated by a maximum number of times that depends on the CE level.

The eNodeB 30 broadcasts a message 91 that includes one or several bits that cause latency tolerant terminal devices to delay a CE level dependent repetition of a random access preamble transmission. The at least one bit may be set in a SIB, for example. The SIB may be a SIB that is evaluated only by certain class(es) of devices, but which is not evaluated by other device class(es). In order to selectively cause eMTC terminal devices to backoff from repeating the random access preamble transmission, the one or several bits indicating this behavior may be included in a SIB that includes specific information for eMTC terminals, for example.

The terminal device 20 transmits a random access preamble 92 in the random access channel (RACH). Transmission of the random access preamble 92 may be triggered when a page signal received from the cellular network indicates that there is MT traffic. Transmission of the random access preamble 92 may alternatively be triggered when the terminal device intends to transmit MO traffic.

When no random access response is received, CE level dependent repetitions of the random access preamble transmission 93, 94 are performed. It will be appreciated that the number of repetitions 93, 94 depends on the CE level. It will be appreciated that the repetitions 93, 94 are implemented in addition to other periodic or aperiodic repetitions of random access preamble transmission that occur even when there is no coverage enhancement. I.e., the repetitions 93, 94 form an inner repetition loop that is performed after each legacy repetition of a random access preamble transmission. The legacy repetitions form an outer repetition loop.

The time interval 96 between successive ones of the CE level dependent repetitions of the random access preamble transmission may depend on subscription level, device type, or other device related parameters. The time interval 96, for at least one subscription level and device type, exceed a time interval 97. The time interval 97 indicates the time interval between successive ones of the CE level dependent repetitions of the random access preamble transmission when there is no backoff behavior in the same CE level. I.e., when the at least one bit in the broadcast message 91 indicates that no backoff behavior is required, the time interval 97 between successive ones of the CE level dependent repetitions of the random access preamble transmission is shorter than the time interval 96 that is applicable when backoff behavior of latency tolerant terminal devices is requested by the eNodeB 30. The extra delay 98 by which the terminal device delays the CE level dependent repetition of the random access preamble transmission may be dependent on device type, subscription level, or other device dependent parameters. The extra delay 98 may be time-varying, e.g. when not only expiry of a backoff timer, but also certain changes in CE level cause the terminal device 20 to perform the CE level dependent repetition of the random access preamble transmission.

It will be appreciated that the extra delay 98 may be included selectively only if there is a risk of congestion in the PRACH resources for a CE level and if, additionally, the terminal device 20 tolerates the increased latency. Such tolerance for increased latency may be caused by a low subscription level or by the device type to which the terminal device 20 belongs.

The CE level dependent repetitions of the random access preamble transmission may be repeated until a random access response is received or a CE level dependent maximum number of repetitions has been reached. When a random access response has been received, the random access procedure may be continued, e.g. by scheduled transmission and contention resolution. The random access procedure may be either a low complexity or a normal complexity random access procedure. When no random access response has been received, a legacy retransmission of the random access preamble 95 may be performed, e.g. in accordance with legacy retransmission criteria.

If no random access response is received, the repetitions of the random access preamble are continued until a CE level dependent maximum count is reached.

Figure 9:
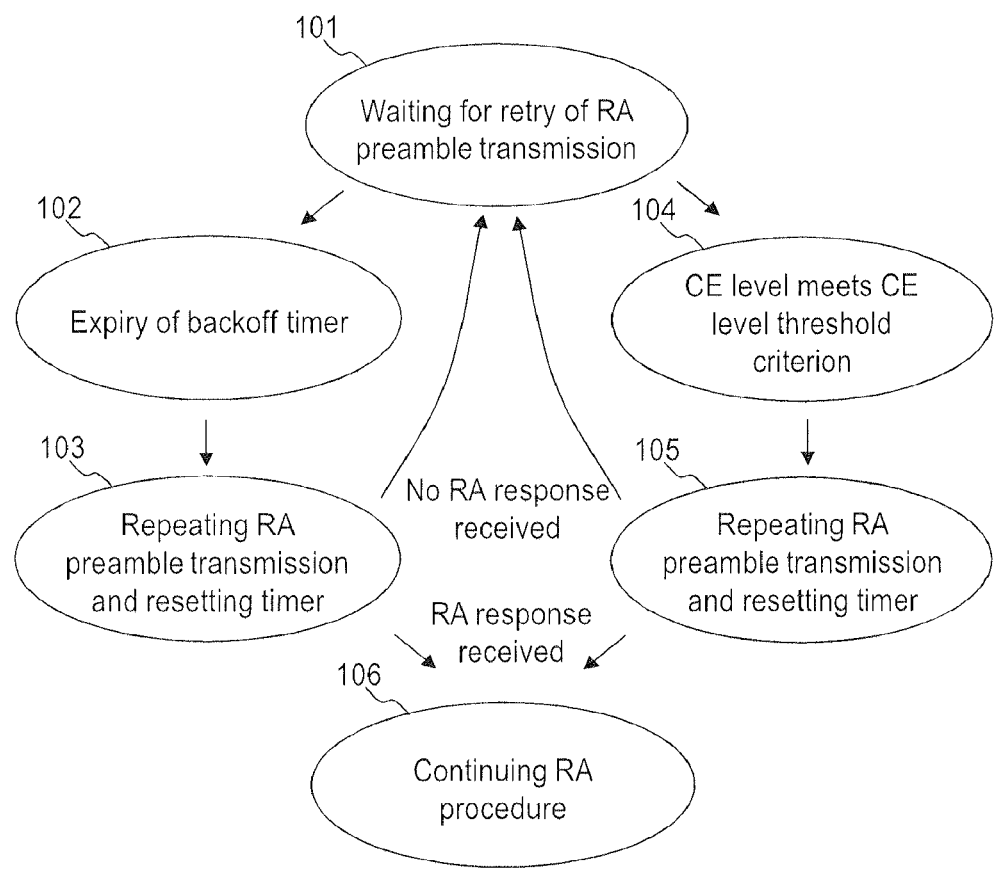
FIG. 9 is a decision logic diagram showing states of a terminal device according to an embodiment.

FIG. 9 illustrates a decision logic that may be implemented in the terminal device. The decision logic may be implemented if not only expiry of a backoff timer, but also a CE level dependent trigger criterion causes the next transmission of the random access preamble to be performed.

The terminal device 20 may have a wait state 101. The wait state 101 may be entered when a random access preamble transmission has been performed. In the wait state 101, the terminal device 20 may monitor expiry of a backoff timer and changes in CE level.

The terminal device 20 may transition from the wait state 101 to a timer expiry state 102 in which expiry of the backoff timer is detected. This causes the terminal device 20 to transition to a transmission repetition state 103 in which the next transmission of the random access preamble is performed. If no random access response is received, the terminal may return to the wait state 101 and apply the appropriate backoff time. If the maximum number of RACH attempts have been performed, the terminal device stops any further RACH attempts. If a random access response is received, the random access procedure is continued at 106.

The terminal device 20 may transition from the wait state 101 to a CE level trigger state 104 in which it is detected that a change in CE level fulfils a criterion. For illustration, the CE level trigger state 104 may indicate that the CE level has improved so that a smaller number of CE level dependent repetitions is required. This causes the terminal device 20 to transition to a transmission repetition state 105 in which the next transmission of the random access preamble is performed. If no random access response is received, the terminal may return to the wait state 101. If the maximum number of RACH attempts have been performed, the terminal device stops any further RACH attempts. If a random access response is received, the random access procedure is continued at 106.

Various effects are attained by the devices, methods and systems according to embodiments. For illustration, a graceful prioritization of terminal devices is implemented when congestion in PRACH resources occurs or is likely to occur. The graceful prioritization does not preclude terminal devices from being granted access, but merely causes latency tolerant terminal devices to delay CE level dependent repetitions of random access preamble transmission. The prioritization also can be implemented with adding very little additional load on the radio access network, because only one or a few bits in a broadcast message are needed. The one or few bits in the broadcast message may cause different behavior in different terminal devices, depending on subscription level, device class, or other terminal dependent parameters.

A backoff behavior may be used in which not only expiry of a backoff timer, but also improvements in CE level may trigger the next repetition of the random access preamble transmission. The earlier one of the timer expiry or of the CE level meeting a certain criterion will respectively cause the next repetition to be performed. Thereby, long latencies may be prevented in cases in which the decrease in signal attenuation makes it likely that a terminal device may successfully perform random access without requiring too many repetitions of random access preamble transmissions.

While exemplary embodiments have been described with reference to the drawings, modifications may be implemented in other embodiments. For illustration, while embodiments have been described in the context of exemplary cellular networks and radio access networks, the techniques discussed herein are applicable to a wide variety of other cellular networks. For further illustration, while exemplary subscription levels and device classes have been described which may result in different backoff behavior, other terminal dependent parameters and/or even parameters that depend on the purpose for which the radio connection is required (public safety or non-public safety) may affect the backoff behavior.

While the terminal device may be a handheld device, a sensor or a wearable device, the techniques disclosed herein may also be used in conjunction with other terminal devices.

Although the invention has been shown and described with respect to certain preferred embodiments, equivalents and modifications will occur to others skilled in the art upon the reading and understanding of the description. The present invention includes all such equivalents and modifications, and is limited only by the scope of the following claims.

The invention claimed is:

1. A terminal device, comprising:
a radio interface operative to receive a broadcast message from a cellular network, the broadcast message including a parameter associated with coverage enhancement, CE, operation of the terminal device and to perform a CE level dependent repetition of a random access preamble transmission; and
an electronic circuit operative to control, when the terminal device is in CE operation, and based on the parameter included in the broadcast message, a CE-level dependent backoff behavior for the CE level dependent repetition of the random access preamble transmission, wherein the parameter indicates which CE level is affected by a potential congestion situation.

2. The terminal device of claim 1, wherein the parameter indicates a CE level threshold.

3. The terminal device of claim 2, wherein the CE level dependent repetition is triggered by the CE level reaching the CE level threshold.

4. The terminal device of claim 1, wherein the CE level dependent repetition includes a first random access preamble transmission and one or more CE level dependent repetitions of the random access preamble transmission, wherein the first random access preamble transmission and the one or more CE dependent repetitions depend on the CE level.

5. The terminal device of claim 1, wherein the first random access preamble transmission is triggered when the CE level reaches a CE level threshold.

6. The terminal device of claim 1, wherein the electronic circuit is operative to control the backoff behavior further based on a subscription level and/or a device type of the terminal device.

7. The terminal device of claim 1, wherein the electronic circuit is operative to delay a CE level dependent repetition of the random access preamble transmission until a trigger event is detected.

8. The terminal device of claim 1, wherein the electronic circuit is operative to detect time-dependent changes in CE level, and wherein the electronic circuit is operative to cause the radio interface to perform the CE level dependent repetition of the random access preamble transmission based on the detected time-dependent changes in CE level.

9. The terminal device of claim 8, wherein the electronic circuit is operative to cause the radio interface to perform the CE level dependent repetition of the random access preamble transmission based on a comparison of the detected time-dependent changes in CE level to a CE level threshold.

10. The terminal device of claim 1, wherein the parameter associated with CE operation is included in a system information block.

11. A cellular network node, comprising:
a radio interface to receive random access preambles from terminal devices, and
a circuit coupled to the radio interface and operative to:
perform congestion monitoring for PRACH resources for one or several coverage enhancement, CE, levels, and
control the radio interface based on the congestion monitoring to broadcast a message that includes a parameter associated with CE operation of terminal devices to control, for at least part of the terminal devices a CE level dependent backoff behavior for repetition of a random access preamble transmission,
wherein the parameter indicates which CE level is affected by a potential congestion situation.

12. The cellular network node of claim 11, wherein the parameter indicates a CE level threshold.

13. A method of performing random access when a terminal device is in coverage enhancement operation, the method comprising:
receiving, by the terminal device, a broadcast message from a cellular network, the broadcast message including a parameter associated with coverage enhancement, CE, operation of the terminal device; and
controlling, when the terminal device is in CE operation and based on the received parameter included in the broadcast message, a CE level dependent backoff behavior for repetition of a random access preamble transmission,
wherein the parameter indicates which CE level is affected by a potential congestion situation.

14. The method of claim 13, wherein the parameter indicates a CE level threshold.

15. A method of performing random access when a terminal device is in coverage enhancement operation, the method comprising:
performing congestion monitoring for PRACH resources for one or several coverage enhancement, CE, levels, and
controlling the radio interface based on the congestion monitoring to broadcast a message that includes a parameter associated with CE operation of terminal devices to control, for at least part of the terminal devices a CE level dependent backoff behavior for repetition of a random access preamble transmission,
wherein the parameter indicates which CE level is affected by a potential congestion situation.

16. The method of claim 15, wherein the parameter indicates a CE level threshold.

* * * * *